United States Patent [19]

Inoue et al.

[11] 4,413,602

[45] Nov. 8, 1983

[54] FUEL INJECTION CONTROL APPARATUS FOR INTERNAL COMBUSTION ENGINE

[75] Inventors: Kazuo Inoue, Tokyo; Ryo Narisawa, Higashikurume; Ryuji Wada, Shiki; Toshihiko Sato, Oi; Hiroshi Irino, Fujimi, all of Japan

[73] Assignee: Honda Giken Kogyo Kabushiki Kaisha, Tokyo, Japan

[21] Appl. No.: 300,542

[22] Filed: Sep. 9, 1981

[30] Foreign Application Priority Data

Sep. 16, 1980 [JP] Japan ............................... 55/127127

[51] Int. Cl.³ ............................................... G02D 5/00

[52] U.S. Cl. .................................... 123/486; 123/488; 123/492

[58] Field of Search ............... 123/486, 492, 488, 493, 123/478

[56] References Cited

U.S. PATENT DOCUMENTS 3,794,003 2/1974 Reddy ................................ 123/493

3,983,851 10/1976 Hoshi ................................ 123/486

4,155,332 5/1979 Yaegashi et al. ..................... 123/478

4,332,226 6/1982 Nomura et al. ...................... 123/478

*Primary Examiner*—Charles J. Myhre

*Assistant Examiner*—Andrew M. Dolinar

*Attorney, Agent, or Firm*—Pollock Vande Sande & Priddy

[57] ABSTRACT

An internal combustion engine fuel injection control apparatus is disclosed in which a basic fuel injection signal for light load is calculated as a function of the manifold pressure when the engine is operating with a light load, and a basic fuel injection signal for heavy load is obtained with the revolution number and the throttle valve position as the parameters when the engine is operating with a heavy load. The engine load condition (light or heavy) is decided in dependence upon the throttle valve position or the manifold pressure. The circuit employed for switch-over from a heavy load to a light load or vice versa preferably has a hysteresis characteristic.

4 Claims, 5 Drawing Figures

COMPARATOR CIRCUIT
HAVING HYSTERESIS CHARACTERISTIC

FUEL INJECTION CONTROL APPARATUS FOR INTERNAL COMBUSTION ENGINE

FIELD OF THE INVENTION

This invention relates to an internal combustion engine control system.

DESCRIPTION OF THE PRIOR ART

For better engine operation and for harmful reduction of exhaust gas emission, it is necessary to control the air-fuel ratio, ignition timing and EGR (Exhaust Gas Recirculation) of an internal combustion engine. To control these factors, mechanical devices such as evaporators and ignition timing control devices have been developed. Such conventional mechanical devices, however, had much difficulty in keeping up with the complicated variation of necessary fuel quantity and ignition timing related to the engine operating parameters. Although some devices were capable of doing so, they were complicated and expensive.

To overcome these difficulties, an electric control device has been proposed in which two parameters are chosen out of such engine operating parameters as throttle valve position (it is termed $\theta$th in the following description) for controlling the volume of the air taken into the engine cylinder, intake manifold pressure (it is termed PB in the following description) of the engine, and the engine revolution number (it is termed Ne in the following description), on one hand, and on the other hand other engine controlling factors (fuel quantity, ignition timing, EGR, etc.) predetermined are stored in a data memory, and in operation, said two sorts of parameters are detected to get the inputs to the data memory so that the required engine controlling factors may be read-out. (e.g., Japanese Patent Publication Serial No. SHO 50-29098 and Japanese Patent Application Serial No. SHO 54-170417).

The conventional apparatus, however, has the disadvantage that it requires a large memory capacity because each value of Ne, PB and $\theta$th must be divided into many small segments in order to effect a precise control of the fuel supply and hence many basic fuel injection signals Ti representing combinations of above parameters must be memorized in the memory, and, in addition, a computation is needed to make a proper correction, e.g., a correction in response to the values of the engine temperature and the aspirated air quantity which vary under many different operation circumstances.

Moreover, in recent years, the memory capacity tends to have an increasing demand to provide various fail-safe functions as countermeasures for engine trouble and functions of automatic operations. To meet those requirements, a computer (such as a micro-computer) is employed. Such a computer, however, needs a large memory capacity, therefore an economic use of the memory is a matter of great concern.

SUMMARY OF THE INVENTION

The present invention obviates the foregoing disadvantages while meeting the aforementioned requirements. More particularly, it is a purpose of this invention to provide an internal combustion engine fuel injection controller with reduced memory capacity.

To achieve said purpose, the basic fuel injection quantity under light load is computed or calculated as a function of PB alone. This is based on a new idea that the basic fuel injection quantity of the engine under light load can be approximately related to PB with a simple linear equation or some straight lines.

BRIEF DESCRIPION OF DRAWINGS

DETAILED DESCRIPTION OF THE INVENTION

Figure 1:
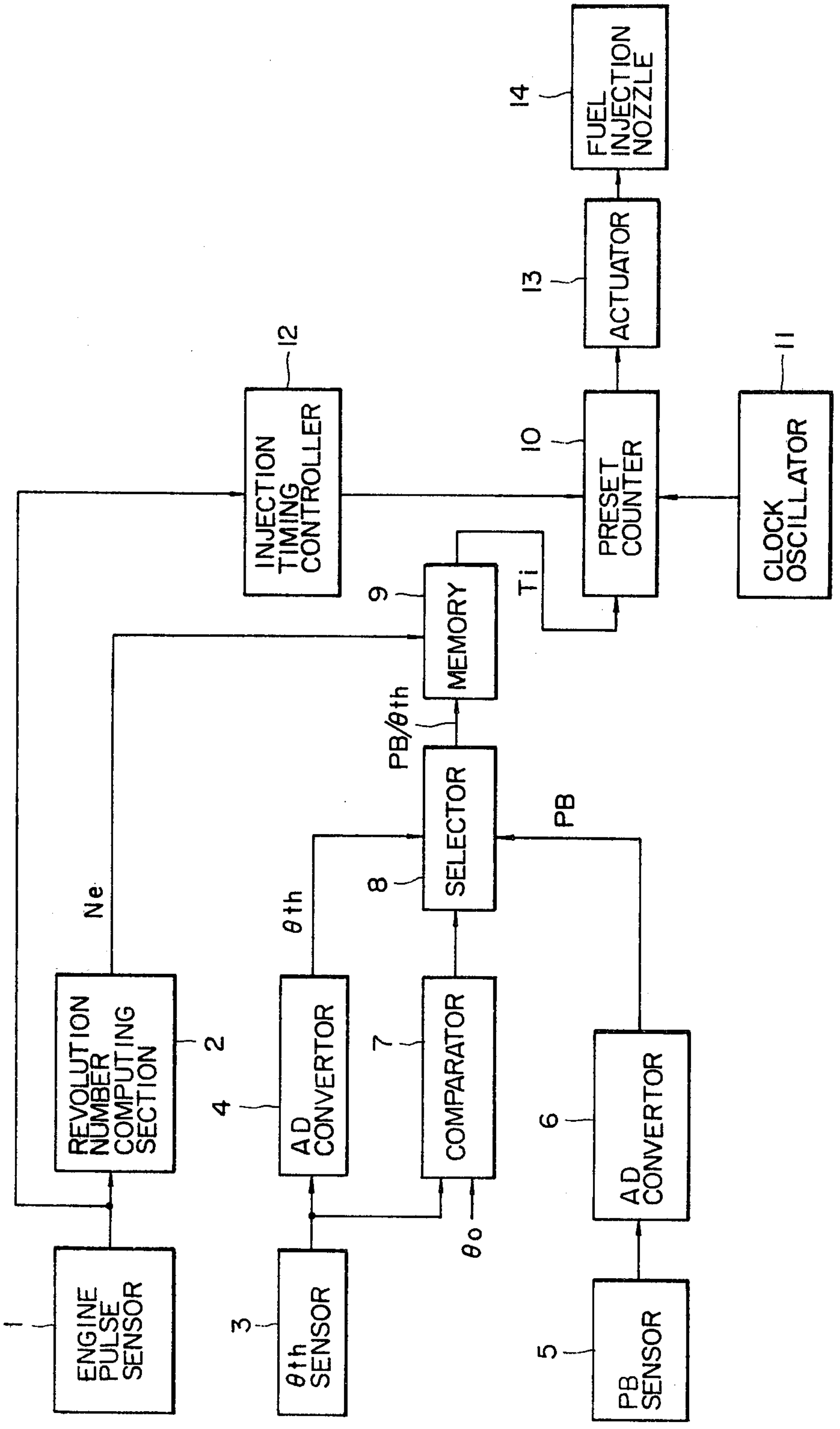
FIG. 1 PRIOR ART
FIG. 1 shows a block diagram of a conventional internal combustion engine fuel injection controller.

FIG. 1 shows a block diagram of an engine control apparatus of the conventional internal combustion engine described hereinbefore, in which the reference number 1 denotes an engine pulse sensor, 2 denotes a revolution number computing section which is supplied with the pulses from sensor 1 to get a revolution number Ne, 3 denotes a sensor of throttle valve position $\theta$th, 4 denotes an AD converter for converting a value $\theta$th detected by sensor 3 into a digital value, 5 denotes a sensor of manifold pressure PB, and 6 denotes an AD convertor for converting a value PB detected at the sensor 5 to a digital value.

The reference number 7 denotes a comparator for comparison of the detected value $\theta$th with a predetermined value $\theta_0$, and 8 denotes a selector which is operative to selectively output either one of the values $\theta$th and PB which are supplied from AD converters 4 and 6, respectively, in accordance with the output of the comparator 7. The reference number 9 denotes a memory for storing a basic fuel injection signal Ti in relation to the parameters Ne and PB, or Ne and $\theta$th.

The reference number 10 denotes a preset counter in which said basic fuel injection signal Ti is preset, and the number 11 denotes a clock oscillator for supplying clock pulses to the preset counter 10. The reference number 12 denotes an injection timing controller for generating a timing signal for defining the start of the preset counter 10, i.e., the start of the fuel injection. The number 13 denotes an actuator supplied with an output of the preset counter 10 to enable a fuel injection nozzle 14.

In the conventional apparatus described above, the selector 8 outputs the manifold pressure PB when the throttle valve position $\theta$th is smaller than the preset value $\theta_0$, i.e., in a light load range of the engine. The manifold pressure PB together with the revolution number Ne addresses an area of the memory 9 so as to read the corresponding basic fuel injection signal Ti.

On the contrary, in the range where $\theta$th is larger than the preset value $\theta_0$, or in the heavy load range of the engine, the selector 8 outputs the throttle valve position $\theta$th. The throttle valve position $\theta$th together with the revolution number Ne addresses a corresponding area of the memory 9 so as to read the basic fuel injection signal Ti.

The signal Ti read in the above manner, is supplied to the preset counter 10. The injection timing controller 12 generates a proper fuel injection timing signal based on the engine pulses from the sensor 1, starting the preset counter 10.

The preset counter 10 produces an output which actuates the actuator 13, enabling the fuel injection nozzle 14, which starts to inject the fuel. At the same time, the preset counter 10 starts to count the clock pulses from the clock oscillator 11 and then gives an output at the time when its count reaches a value corresponding to the predetermined value Ti. This output stops the fuel injection.

Thus, the fuel supply control is attained in accordance with the engine operating condition.

Figure 2:
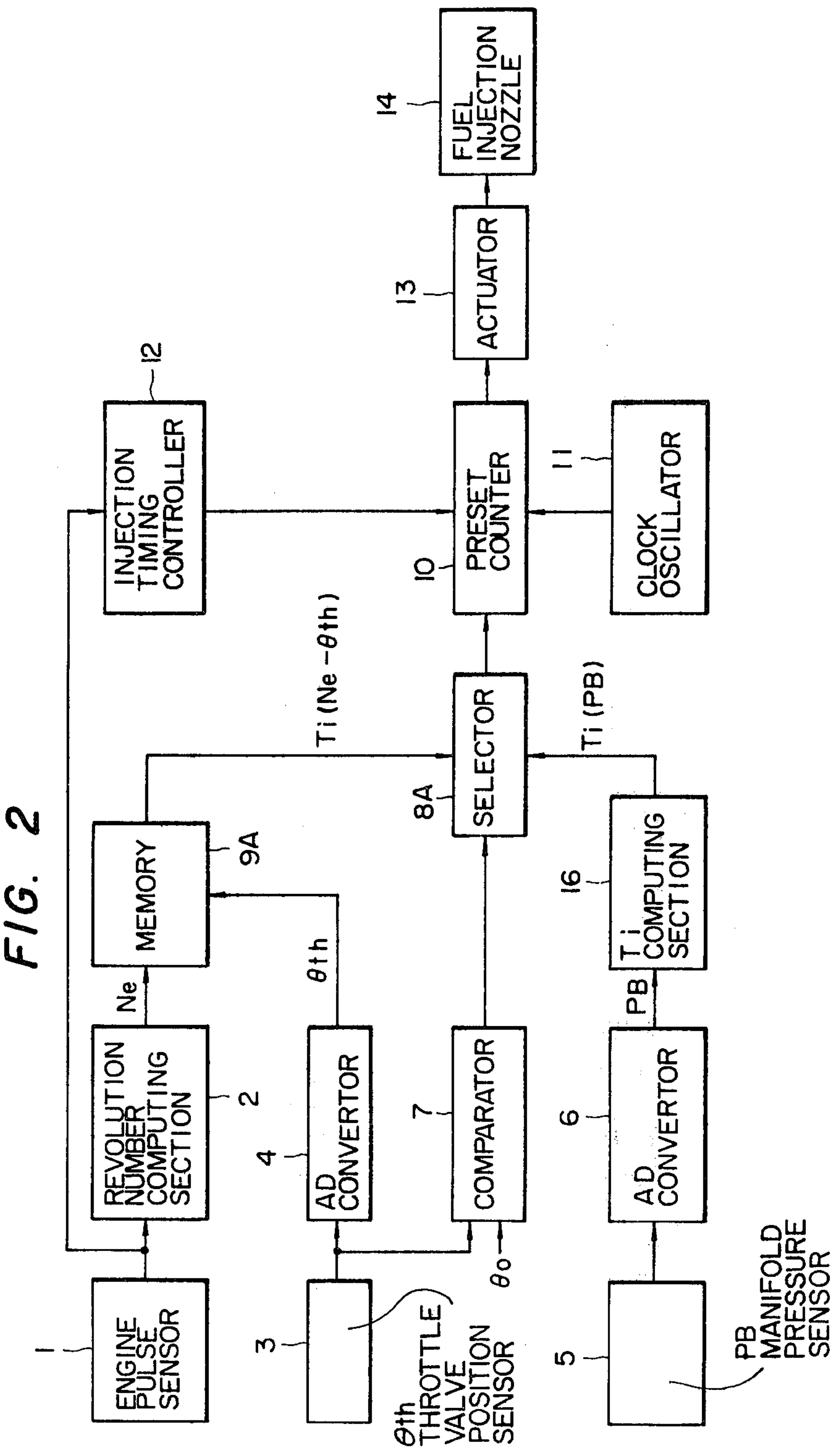
FIG. 2 shows a block diagram of an embodiment of this invention.

FIG. 2 shows a block diagram of an embodiment of this invention. The same reference numbers as those in FIG. 1 show the same or equivalent parts. The letter 9A denotes a memory for memorizing a basic fuel injection signal Ti (Ne-$\theta$th) for a heavy load with the parameters Ne and $\theta$th. The reference number 16 denotes a computer section for computing the basic fuel injection signal Ti (PB) for a light load as a function of only manifold pressure PB.

The detected value PB of the PB sensor 5 is converted at AD converter 6 to a digital value which is supplied to the Ti computing section 16 in which the basic fuel injection signal Ti (PB) for the light load is computed and output as a function of only PB. The engine revolution number Ne and the throttle valve position $\theta$th are used to address the memory 9A, so that a basic fuel injection signal Ti (Ne-$\theta$th) corresponding to Ne and $\theta$th is read out of the memory 9A for the heavy load.

The comparator 7, as was described in relation with FIG. 1, compares $\theta$th with the preset value $\theta_0$ and gives an output to control the selector 8A in such a way as to give Ti (PB) in the range where $\theta$th is smaller than $\theta_0$, or in light load range of the engine. On the contrary, comparator 7 controls the selector 8A in such a way as to give Ti (Ne-$\theta$th) in the range where $\theta$th is larger than $\theta_0$, or in heavy load range of the engine.

Operation after the output of the selector 8A is set at the preset counter 10 is the same as that explained with reference to FIG. 1 so no further explanation will be made here.

Figure 3:
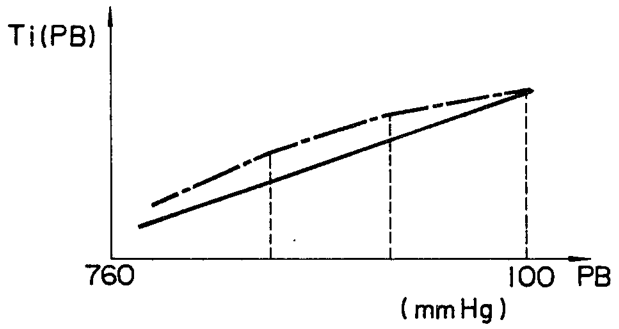
FIG. 3 is a graph showing a relation between PB and Ti (PB).

FIG. 3 shows an example of a relation between a light load basic fuel injection signal Ti (PB) and a manifold pressure PB, in which a solid line shows a linear approximation and a dot-and-dash line shows an approximation by plural lines.

The relation varies with the sort and the number of cylinders, output power and other design feature of the engine and is usually determined empirically.

Figure 5:
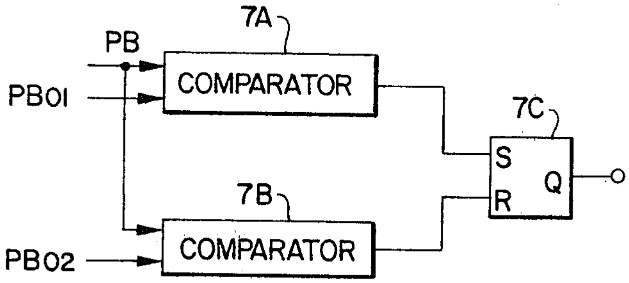

The embodiment illustrated and explained so far is an example of an apparatus in which the entire memory area for storing the light load basic fuel injection signal with the parameters Ne and PB is replaced with the computation based on PB. However, it is not always necessary to replace all of them. Also, a combination of computation based on PB, and values read out of memory by using Ne-PB and that by using Ne-$\theta$th, may be adopted in accordance with the necessity of memory capacity reduction, or the difficulty of computation of the function representing the relation between PB and the light load basic fuel injection signal. Moreover, the input to the comparator 7 may be PB instead of $\theta$th, and the switching of the parameters for deciding the basic fuel injection signal from $\theta$th to PB, or vice versa, may be decided by PB instead of $\theta$th, e.g. as shown in FIG. 5.

Figure 4:
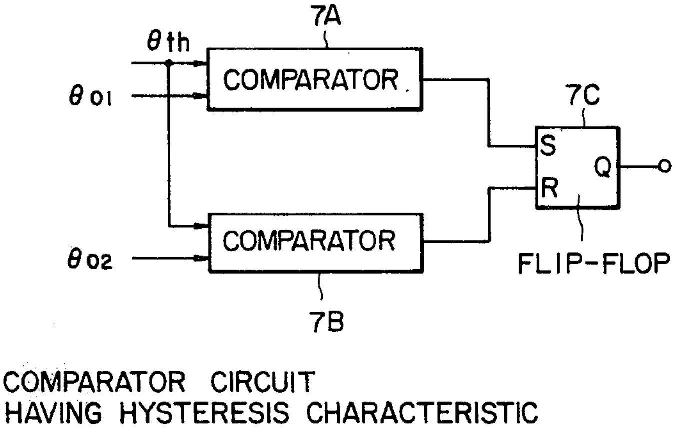
FIGS. 4 and 5 are block diagrams of a comparator circuit having a hysteresis characteristic.

In an implementation of this invention, it is preferred that the comparator 7 be so constructed as to have a hysteresis characteristic. An example of such an arrangement is shown in FIG. 4. In the figure, the reference letters 7A and 7B denote comparators with their reference values $\theta_{01}$ and $\theta_{02}$ respectively ($\theta_{01}$ is smaller than $\theta_{02}$), and 7C denotes a flip-flop.

Upon an incremental variation of $\theta$th starting with a very small value, the comparator 7A gives an output logic "0" and the comparator 7B gives an output logic "1" in the range where $\theta$th is smaller than $\theta_{01}$, the flip-flop 7C in reset state giving a logic "0" at its output terminal Q. For $\theta$th larger than $\theta_{01}$, the comparator 7B gives an output logic "0", while the output of the comparator 7A remains unchanged.

For $\theta$th larger than $\theta_{02}$, the comparator 7A gives an output logic "1" so that the flip-flop 7C is set and the output Q becomes "1".

In a decremental variation of $\theta$th starting with a very large value, the comparator 7A turns its output to logic "0" at the time when $\theta$th becomes smaller than $\theta_{02}$, while the flip-flop 7C keeps its preceding state. That is the output Q is in logic "1".

When $\theta$th becomes smaller than $\theta_{01}$, the comparator 7B gives "1", reversing the state of flip-flop 7C to give "0" at the output Q. Therefore, an application of the output of the flip-flop 7C instead of the output of the comparator 7 shown in FIG. 2 will realize a hysteresis characteristic in changing over of the signal from Ti (Ne-$\theta$th) to Ti (PB), and vice versa. Consequently, a more stable and smooth change will be realized. As is obvious from the above explanation, according to the present invention, necessary memory capacity can be reduced without decreasing the performance of the fuel injection quantity control, the cost being decreased.

FIG. 5 is a comparator circuit that is the same as the circuit of FIG. 4 except that, in FIG. 5, the inputs to the circuit are PB, and reference values $PB_{01}$ and $PB_{02}$. The circuit of FIG. 5 operates in the same way as that of FIG. 4, but provides an output which is indicative of whether the detected manifold pressure PB is above or below the preset values of manifold pressure $PB_{01}$ and $PB_{02}$.

What we claim is:

1. An internal combustion engine fuel injection control apparatus comprising:

an injection nozzle for supplying fuel to the engine by injection, means for detecting the engine revolution number, throttle valve position, and manifold pressure of the engine, comparator means for comparing the detected manifold pressure with a preset value of manifold pressure, said comparator means being operative to provide an output indicative of whether said detected manifold pressure is above or below said preset value, memory means for storing a basic fuel injection signal for heavy load, said memory means being addressed by the said engine revolution number and throttle valve position to provide said basic fuel injection signal, computer means for calculating a basic fuel injection signal for light load as a function of manifold pressure only, a selector responsive to the output of said comparator means for selecting the basic fuel injection signal provided by said computer means for light load when the engine is operating with a light load, and for selecting the basic fuel injection signal provided by said memory means for heavy load when the engine is operating with a heavy load, and means responsive to the selected basic fuel injection signal for enabling the injection nozzle to supply fuel to the engine by injection.

2. An internal combustion engine fuel injection control apparatus according to claim 1 wherein said comparator means has a hysteresis characteristic in its operation.

3. An internal combustion engine fuel injection control apparatus comprising:

an injection nozzle for supplying fuel to the engine by injection, means for detecting the engine revolution number, throttle valve position, and manifold pressure of the engine, comparator means for comparing the detected throttle valve position with a preset value of throttle valve position, said comparator means being operative to provide an output indicative of the results of said comparison, memory means for storing a basic fuel injection signal for heavy load, said memory means being addressed by the said engine revolution number and throttle valve position to provide said basic fuel injection signal, computer means for calculating a basic fuel injection signal for light load as a function of manifold pressure only, a selector responsive to the output of said comparator means for selecting the basic fuel injection signal provided by said computer means for light load when the engine is operating with a light load, and for selecting the basic fuel injection signal provided by said memory means for heavy load when the engine is operating with a heavy load, and means responsive to the selected basic fuel injection signal for enabling the injection nozzle to supply fuel to the engine by injection.

4. An internal combustion engine fuel injection control apparatus according to claim 3 wherein said comparator means has a hysteresis characteristic in its operation.

* * * * *